(12) United States Patent
Nitsche et al.

(10) Patent No.: US 11,002,672 B2
(45) Date of Patent: May 11, 2021

(54) ELECTROMAGNETIC WAVE CONVERTER

(71) Applicant: Halliburton Energy Services, Inc., Houston, TX (US)

(72) Inventors: Wolfgang Hartmut Nitsche, Humble, TX (US); John Laureto Maida, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 271 days.

(21) Appl. No.: 16/332,317

(22) PCT Filed: Dec. 29, 2017

(86) PCT No.: PCT/US2017/068941
§ 371 (c)(1),
(2) Date: Mar. 11, 2019

(87) PCT Pub. No.: WO2019/132978
PCT Pub. Date: Jul. 4, 2017

(65) Prior Publication Data
US 2021/0033526 A1    Feb. 4, 2021

(51) Int. Cl.
*G01N 21/3581* (2014.01)
*E21B 49/08* (2006.01)

(52) U.S. Cl.
CPC ....... *G01N 21/3581* (2013.01); *E21B 49/082* (2013.01)

(58) Field of Classification Search
CPC . G01N 21/3581; E21B 49/082; E21B 49/081; G01J 3/10; G01J 3/42
See application file for complete search history.

(56) References Cited

U.S. PATENT DOCUMENTS

| 6,049,080 A * | 4/2000 | Ito ............................ G01J 5/02 |
| | | 250/338.3 |
| 7,847,254 B2 * | 12/2010 | Rafailov ............... H01L 31/095 |
| | | 250/341.1 |
| 2002/0176649 A1 | 11/2002 | Bao et al. |
| 2006/0050352 A1 | 3/2006 | Schwarte |
| 2009/0038794 A1 | 2/2009 | Yamate et al. |

(Continued)

FOREIGN PATENT DOCUMENTS

WO    2016134684 A1    9/2016

OTHER PUBLICATIONS

PCT Application Serial No. PCT/US2017/068941, International Search Report, dated Sep. 28, 2018, 4 pages.

(Continued)

*Primary Examiner* — Christine S. Kim
(74) *Attorney, Agent, or Firm* — Gilliam IP LLC

(57) ABSTRACT

An apparatus is disclosed for generating electromagnetic waves such as terahertz waves. The apparatus may comprise a finger structure having a plurality of conductive lines, wherein at least two of the plurality of conductive lines is separated by photosensitive material, a plurality of detectors, and a capacitor having a plurality of conductive lines separated by a dielectric material. Light from a laser incident on the photosensitive material causes free carriers in the photosensitive material to move to a conduction band and be accelerated by a voltage across the conductive lines of the finger structure applied by the capacitor to produce the terahertz waves.

20 Claims, 9 Drawing Sheets

(56) References Cited

U.S. PATENT DOCUMENTS

2009/0262766 A1* 10/2009 Chen .................. H03C 7/027
372/26
2013/0056202 A1 3/2013 Maida
2019/0078933 A1* 3/2019 Dardona ................ G01J 1/02

OTHER PUBLICATIONS

PCT Application Serial No. PCT/US2017/068941, International Written Opinion, dated Sep. 28, 2018, 4 pages.
"Auston Switch", [online] retrieved on Feb. 28, 2019 from <https://en.wikipedia.org/wiki/Auston_switch>.
Acuna, "Far Field and Near Field Terahertz Spectroscopy on Parabolic Quantum Wells", [online] retrieved on Feb. 28, 2019 from <https://www.researchgate.net/publication/44389240_Far_Field_and_Near_Field_Terahertz_Spectroscopy_on_Parabolic_Quantum_Wells>, 2010.

* cited by examiner

ELECTROMAGNETIC WAVE CONVERTER

TECHNICAL FIELD

The disclosure generally relates to the field of physics, and more particularly to converting electromagnetic waves such as light waves into terahertz waves.

BACKGROUND ART

Terahertz waves are generally electromagnetic waves with a frequency range of 100 GHz to 10 THz (1 THz: $10^{12}$ Hz). Terahertz waves are generally generated by an antenna structure resonating at terahertz frequencies which causes electromagnetic waves to be emitted at the terahertz frequencies. The resonance is typically produced optically or electrically. In some cases, the terahertz waves form a terahertz pulse.

A common application for use of terahertz waves is to detect properties of matter in a non-destructive, non-opening, and non-contact manner. The terahertz waves are directed toward a sample such as a solid, liquid, or gas material. Certain frequency waves of the terahertz waves may be transmitted through the sample and others absorbed. The transmitted and/or absorbed waves of the terahertz waves though the sample is indicative of the molecular composition of the sample.

BRIEF DESCRIPTION OF THE DRAWINGS

Embodiments of the disclosure may be better understood by referencing the accompanying drawings.

DESCRIPTION

Figure 1:
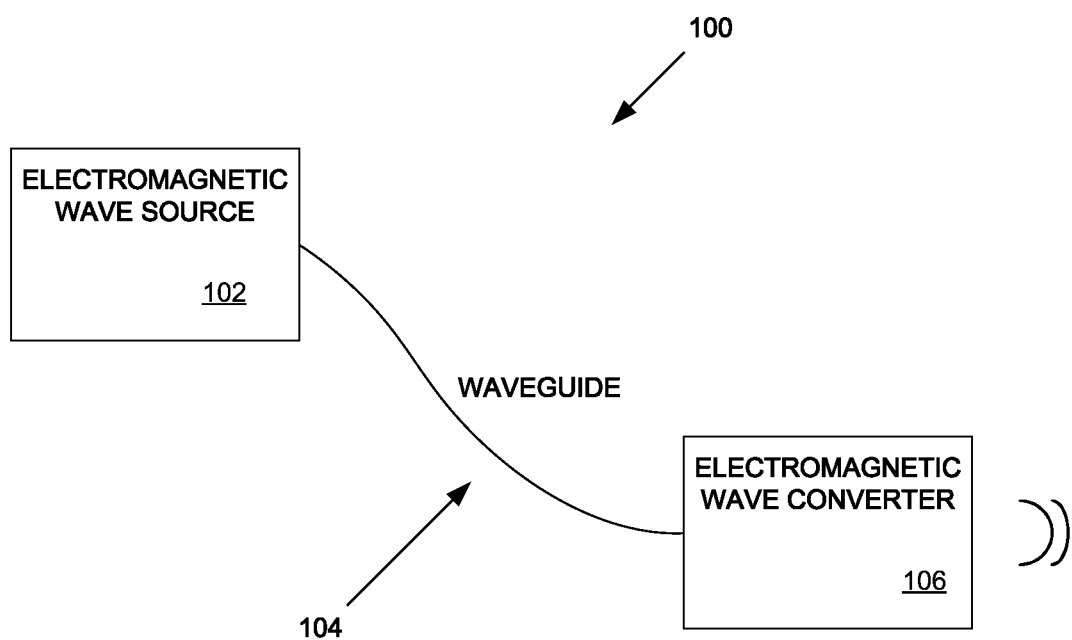
FIG. 1 illustrates a block diagram of an exemplary electromagnetic wave converter system in accordance with one or more embodiments.

The description that follows includes example systems, methods, techniques, and program flows associated with converting light waves into terahertz waves. However, it is understood that this disclosure may be practiced without one or more of these specific details. In other instances, well-known instruction instances, protocols, structures and techniques have not been shown in detail in order not to obfuscate the description.

Various solids, liquids, and gasses may be encountered during a hydrocarbon extraction process. A type of the solid, liquid, and/or gasses that is encountered may be analyzed using terahertz waves. Terahertz waves can be directed toward a sample of the solid, liquid, and/or gas such that certain frequencies of the terahertz waves may be transmitted through the sample and/or others absorbed by the sample. Based on the terahertz waves transmitted and/or absorbed, a molecular composition of the sample can be determined e.g., a chemical structure. Additionally, water content and contamination can be analyzed in the sample to ensure that the extraction process is on track and the well will be productive.

Embodiments described herein are directed to an electromagnetic wave converter to facilitate the determination of the molecular composition of a sample in downhole applications, among other functions. The electromagnetic wave converter may operate to convert a first electromagnetic wave such as light to a second electromagnetic wave such as terahertz waves. In some examples, the light waves may take the form of a light pulse in which case the terahertz waves may take the form of a terahertz pulse. The electromagnetic wave converter may have an interdigitated finger structure, a plurality of detectors, and a capacitor. The interdigitated finger structure may have a plurality of conductive lines each separated by a gap with an electromagnetically sensitive material, e.g., a photosensitive material. The plurality of detectors may take the form of photodiodes which convert the light waves into a current. For example, a light pulse incident on the plurality of photodiodes from a laser may be converted into a current which is input into the capacitor. The capacitor may have conductive lines separated by a dielectric material and be connected to the detectors and the interdigitated finger structure. The capacitor may store a charge based on the current and apply a corresponding voltage across the conductive lines of the interdigitated finger structure. The capacitor may be sized to store sufficient charge such that a minimum voltage is maintained across the conductive lines of the finger structure until another light pulse is incident onto the plurality of detectors to replenish charge which may leak out from the capacitor.

The photosensitive material may have free carriers, e.g., holes and electrons. Certain of the gaps of photosensitive material between certain of the conductive lines of the finger structure may be covered by a lightproof material. The lightproof material may prevent the light from reaching photosensitive material. Other gaps of photosensitive material between certain of the conductive lines of the interdigitated finger structure may not be covered by the lightproof material.

The light pulse may be incident on both the photosensitive material covered and not covered by the lightproof material. Based on the light pulse, free carriers in the photosensitive material which is not covered by the lightproof material may be excited and move to a conduction band and free carriers in the photosensitive material covered by the light proof material may not move into the conduction band. The voltage applied by the capacitor may form an electric field across the conductive lines of the interdigitated finger structure and cause the free carriers which moved into the conduction band to be accelerated in the direction of the electric field. The acceleration of the charges may cause a time varying current which in turn produces electromagnetic waves in the terahertz frequency band. Further, the electric field may accelerate the free carriers in a same direction across the interdigitated finger structure so that the terahertz waves constructively interfere.

The electromagnetic wave converter may be able to generate terahertz pulses from light pulses without a need for a battery or power supply. Instead, voltage may be generated based on the light pulses incident on the plurality of detectors and maintained by the capacitor. As a result, the electromagnetic wave converter may be suited for use in downhole applications. Only light may need to be transmitted to the electromagnetic wave converter to cause it to generate terahertz waves. No battery or power supply may need to be located downhole.

Example Systems

Illustrative embodiments and related methodologies of the present disclosure are described below in reference to the examples shown in FIGS. 1-9 as they might be employed, for example, in the context of converting light waves into terahertz waves. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented. While these examples may be described in the context of generating terahertz waves for hydrocarbon extraction in a downhole environment, it should be appreciated that the generation is not intended to be limited thereto and that these techniques may be applied in other contexts as well.

FIG. 1 illustrates an arrangement of an electromagnetic wave converter system 100. The electromagnetic wave converter system 100 may include an electromagnetic wave source 102, a waveguide 104, and an electromagnetic wave converter 106. The electromagnetic wave source 102 may output electromagnetic waves of a first frequency. For example, the electromagnetic wave source 102 may be a laser which outputs light waves. The light waves may be electromagnetic waves that span one or more of an infrared, visible, and/or ultraviolet range, among others ranges. In some examples, the laser may be a pulsed laser which outputs pulses of light waves. The light pulses may be light waves emitted for a given duration. The pulsed laser may refer to any laser such that optical power appears in pulses of some duration at some repetition rate. For example, the pulse may be less than 100 femtosecond in the visible or near infrared range (e.g., 800 nm). In this regard, the optical source 102 may take the form of a titanium (Ti) sapphire ($Al_2O_3$) (also written $Ti:Al_2O_3$) fiber laser for femtosecond pulses or a frequency doubled erbium (Er) doped fiber laser among other arrangements.

The waveguide 104 may couple the electromagnetic waves, e.g., light waves, from the electromagnetic source 102 and direct the light waves to the electromagnetic wave converter 106. The waveguide 104 may be an optical fiber. The optical fiber may be a flexible transparent fiber made of glass or plastic and typically includes a core surrounded by a transparent cladding material. Light is kept in the core by a phenomenon of total internal reflection. The waveguide 104 may be able to transmit the light waves over long distances.

The electromagnetic wave converter 106 may convert the electromagnetic waves received from the electromagnetic wave source 102 into electromagnetic waves of a second frequency. The second frequency may be terahertz waves 108 and in some examples the terahertz waves may be terahertz pulses. The terahertz pulses may be terahertz waves emitted for a given duration which may be the same or different from the given duration that the electromagnetic waves are received from the electromagnetic wave source 102.

Advantageously, the electromagnetic wave converter 106 may be able to generate terahertz pulses without a need for a battery or power supply. For example, the electromagnetic wave converter 106 may be able to generate the terahertz pulses based on light pulses from the electromagnetic wave source 102. This makes the electromagnetic wave converter system 100 well suited for determining composition of samples of solids, liquids, and/or gases found downhole during hydrocarbon extraction as described in further detail below.

Figure 2:
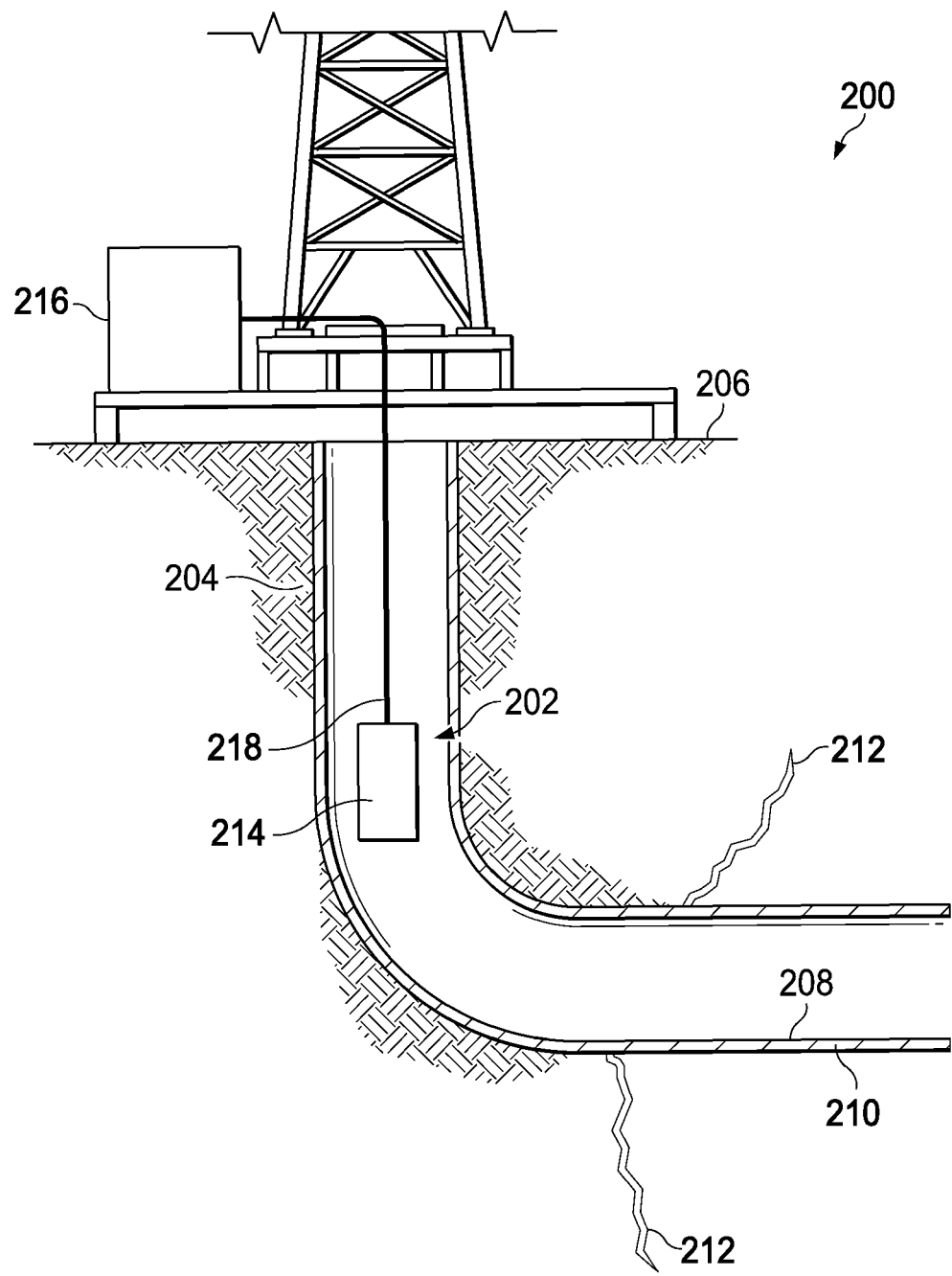
FIG. 2 is a schematic diagram of the exemplary electromagnetic wave converter system in a well system.

FIG. 2 is a schematic diagram of an arrangement of the exemplary electromagnetic wave converter system in a well system 200. The well system 200 includes a wellbore 202 in a subsurface formation 204 beneath a surface 206 of a wellsite. Wellbore 202 as shown includes a horizontal wellbore. However, it should be appreciated that embodiments are not limited thereto and that well system 200 may include any combination of horizontal, vertical, slant, curved, and/or other wellbore orientations. The subsurface formation 204 may include a reservoir that contains hydrocarbon resources, such as oil, natural gas, and/or others. For example, the subsurface formation 204 may be a rock formation (e.g., shale, coal, sandstone, granite, and/or others) that includes hydrocarbon deposits, such as oil and natural gas. In some cases, the subsurface formation 204 may be a tight gas formation that includes low permeability rock (e.g., shale, coal, and/or others). The subsurface formation 204 may be composed of naturally fractured rock and/or natural rock formations that are not fractured initially to any significant degree.

In some examples, the wellbore 202 may be lined with a casing 208 and cement 210. The wellbore may also have example fractures 212. The fractures 212 may provide fluid communication between the casing 208 and cement 210 and the subsurface formation 204. Hydrocarbons may flow from the fractures 212 through the wellbore 202 and to the surface 206 for collection.

An electromagnetic wave converter system similar to that shown in FIG. 1 may be arranged in the well system 200. The electromagnetic wave converter system may include an electromagnetic wave converter 214, optical source 216, and a waveguide 218.

The electromagnetic wave converter 214 may be placed downhole in the wellbore 202. The optical source 216 may be placed on the surface 206 and the waveguide 218 may couple the optical source 216 and the electromagnetic wave converter 214. Light waves from the optical source 216 on the surface 206 may be coupled to a waveguide 218 which directs the light waves to the electromagnetic wave converter 214. The waveguide may span a distance between the optical source 216 and the electromagnetic wave converter 214 allowing the light waves to travel long distances with low loss, e.g., 0.3 dB/km. The light waves may take the form of light pulses in which case the electromagnetic wave converter 214 may generate terahertz pulses based on the light pulses from the optical source 216.

The electromagnetic wave converter 214 may be exposed to high temperatures and/or pressures the deeper the electromagnetic wave converter 214 is located in the wellbore 202. In embodiments, the electromagnetic wave converter 214 may generate terahertz pulses in the wellbore 202 based on the light pulses and without a need for a battery or power supply located downhole which would otherwise be sensitive to the high temperatures and/or pressures. Instead, the optical source 216 which is sensitive to high temperatures and/or pressures downhole may remain at or near the surface 206.

Further, use of the electromagnetic wave converter 214 in the well system 200 is exemplary in nature. The electromagnetic wave converter may be used in other applications such as remote cross-country oil pipelines where providing battery power or a power supply to power the electromagnetic wave converter would otherwise be challenging.

Figure 3:
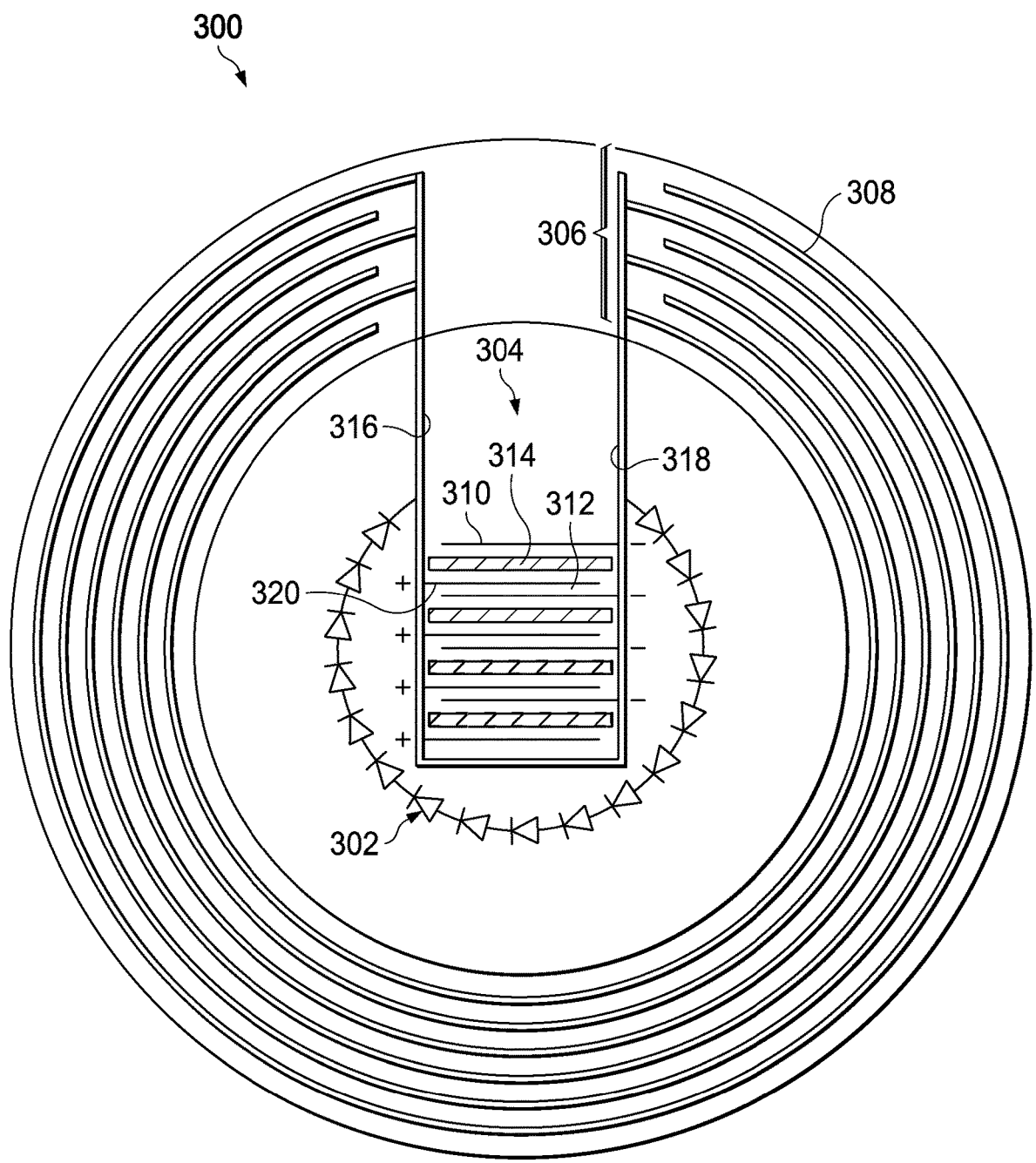
FIG. 3 is a schematic diagram of the electromagnetic wave converter in accordance with one or more embodiments.

FIG. 3 is a schematic diagram illustrating the electromagnetic wave converter shown as the electromagnetic wave converter 106 of FIG. 1 and the electromagnetic wave converter 218 of FIG. 2. The electromagnetic wave converter 300 may have one or more detectors 302, a finger structure 304, and a capacitor 306.

The one or more detectors 302 may take the form of one or more photodiodes arranged to convert energy such as light waves into a current. The detectors 302 may generate this current in a variety of ways. For example, the one or more detectors 302 may each have a contiguous P-type doped region, a contiguous N-type doped region, and a PN-junction therebetween. The P-type doped region may have a surplus of holes which have a positive charge and the N-type doped region may have a surplus of electrons which have a negative charge. The light may cause the holes in the P-type region and the electrons in the N-type region to move into a conduction band such that the electrons in the N-type region flow in the P-type region and the holes in the P-type region to flow in the N-type region across the PN-junction therebetween creating a current.

The one or more detectors 302 may be connected in series. The series connection allows for the current produced by each detector 302 to be combined together to generate current larger than a current produced by any one detector 302. The one or more detectors 302 are further arranged as a ring of detectors in the electromagnetic wave converter 300. The ring of detectors 302 is exemplary in nature and the one or more detectors 302 may be arranged linearly, rectangularly, or in other patterns.

The one or more detectors 302 may be electrically connected to the capacitor 306. The capacitor 306 may be formed by conductive lines 308 such as at least two electrical conductors (e.g., gold or copper) often in the form of metallic plates or metallic surfaces separated by a dielectric medium. The capacitor 306 may function to store an electric charge. In this embodiment, the capacitor 306 is shown as a circular structure surrounding the one or more detectors 302. Like the ring of detectors, the capacitor 306 may be arranged in other shapes as well.

The finger structure 304 may be composed of interdigitated finger electrodes. The finger structure 304 (also referred to herein as interdigitated finger structure) may take a variety of forms. The finger structure 304 may have main lines 316, 318 coupled to finger lines 310, 320 respectively. The main lines 316, 318 and finger lines 310, 320 may be made of electrical conductors such as copper or gold. The main lines 316, 318 may be coupled to the capacitor 306 and detectors 302. Further, the main line 316 may be coupled to finger lines 320 and the main line 318 may be coupled to finger line 310. As shown, the main line 316 may have a positive charge while the main line 318 may have a negative charge based on a charge stored in the capacitor 306, or vice versa. As a result, the finger lines 310, 320 may have a negative and positive charge, respectively, or vice versa, thus acting as electrodes. The finger lines 310, 320 may be interdigitated and centered within the detectors 302 separated by gaps 312.

The finger structure 304 is shown as exhibiting substantially square loop geometries. However, the geometries (e.g., shape, size, and layout) of the finger structure 304 may be modified according to the particular application and the example embodiments described herein are not limiting with respect to such potential geometries. The shape of the finger structure 304 could be a simple dipole, a bowtie dipole, a spiral, a square loop, a square spiral, a circular loop, concentric loops, an ellipse, a rectangle, a triangle, a cross, or any other shape. The geometries of the finger structure 304, e.g., finger lines 310, 320 and gaps 312 (and the one or more detectors 302 and capacitor 306 for that matter), may further be tailored (e.g., tuned) to define a terahertz frequency at which the finger structure 304 resonates. For examples, a designer may have several degrees of freedom in tailoring the finger lines 310, 320. A shape, dimensions (e.g., length (L), width (W)), spacing (X) between the finger lines 310, 320) may define the resonance frequency. Examples of the L and W may be on the order of 1/10 of a mm to generate 0.1 to 0.2 THz waves when the light waves are produced by a 100 fs laser.

A portion of the gaps 312 between the finger lines 310, 320 may be covered, e.g., masked, with a lightproof material 314. The light proof material 314 may be an insulative material which absorbs and/or reflects the light waves. In this regard, the lightproof material may take a variety of forms serving the function of preventing the light waves from the laser from passing through the lightproof material 314 and reaching a layer below the gap 312 as described in further detail below.

Figure 4:
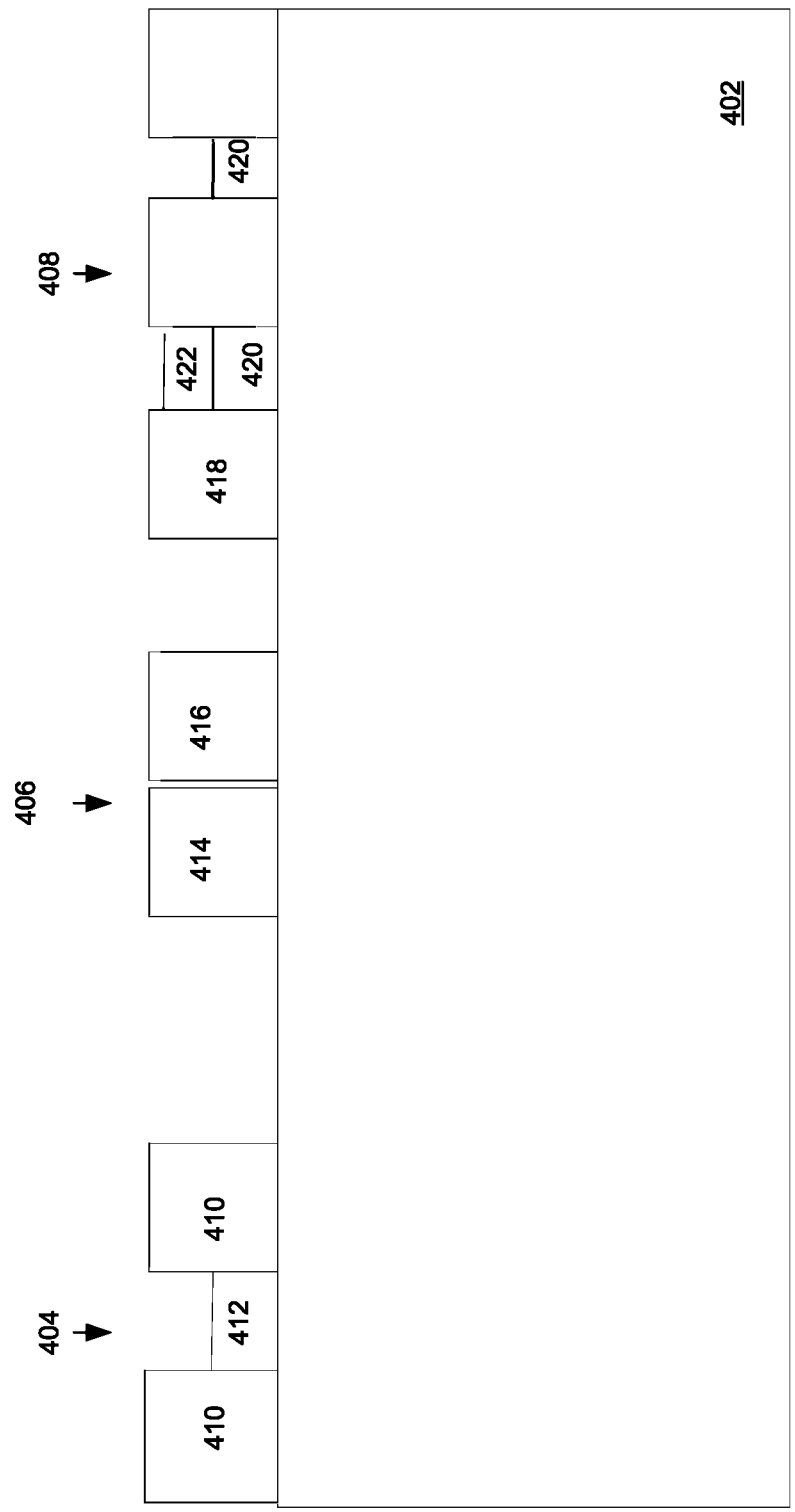
FIG. 4 illustrates a cross sectional view of the electromagnetic wave converter in accordance with one or more embodiments.

FIG. 4 illustrates a cross sectional view 400 of the electromagnetic wave converter show in FIG. 4. The electromagnetic wave converter may include a semiconductor substrate 402, structure 404 of the capacitor, structure 406 of detector, and structure 408 of the finger structure.

The electromagnetic wave converter be formed on the semiconductor substrate 402. As non-limiting examples, the semiconductor substrate 402 may comprise a semiconductor-based material including silicon (Si), silicon-on-insulator (SOI) or silicon-on-sapphire (SOS) technology, doped and undoped semiconductor materials, epitaxial layers of silicon supported by a base semiconductor foundation, and other semiconductor structures. In addition, the semiconductor material need not be silicon-based, but may be based on silicon-germanium (SiGe), silicon-on-insulator, silicon-on-sapphire, germanium (Ge), or gallium arsenide (GaAs), among others. For example, the semiconductor substrate 402 may include one or more of an elemental semiconductor material (e.g., silicon (Si), germanium (Ge), antimony (Sb), etc.), a binary compound semiconductor material (e.g., SiGe, silicon carbide (SiC), indium antimonide (InSb), indium arsenide (InAs), gallium antimonide (GaSb), aluminum antimonide (AlSb), gallium nitride (GaN), gallium arsenide (GaAs), cadmium telluride (CdTe), etc.), and a tertiary compound semiconductor material (e.g., mercury cadmium telluride (HgCdTe), indium gallium arsenide (InGaAs), cadmium zinc telluride (CdZnTe), mercury bromine iodide (HgBrI), etc.).

One or more of the capacitor, detector, and finger structure may be grown on the semiconductor substrate 402 through conventional semiconductor fabrication processes including chemical vapor deposition (CVD), physical vapor deposition (PVD), molecular beam epitaxy (MBE), electrochemical deposition (ECD), chemical-mechanical planarization (CMP), and others. Structure 404 may be representative of the capacitor, structure 406 may be representative of the detector, and structure 408 may be representative of the finger structure.

The structure 404 of the capacitor may comprise conductive traces 410 (e.g., such as gold or copper) separated by a dielectric material 412. The dielectric material 412 may the same as the semiconductor substrate 402 or some other material.

The structure 406 of the detector may comprise a P-type doped material 414 and N-type doped material 416.

The structure 408 of the finger structure may comprise conductive traces 418 separated by an electromagnetically sensitive material. In some examples, the electromagnetically sensitive material may be photosensitive material 420. The conductive traces 418 may be made of a same material as the conductive traces 410 or another material. The conductive traces 418 may include the main lines and finger lines. The photosensitive material 420 may be a doped material such as GaAs. The photosensitive material 420 be chosen to have a large band gap so that temperature alone may not cause free carriers to move into the conduction band due to high temperatures found in the wellbore. Further, the structure 408 shows a lightproof layer 422 which may cover some of the photosensitive material 420. Alternatively, the photosensitive material 420 may not be formed in between some of the conductive traces 418 alleviating a need for the lightproof layer 422 at an expense of higher fabrication complexity. Still alternatively, the photosensitive material 420 may be formed and then etched away in between some of the conductive traces 418.

Figure 5:
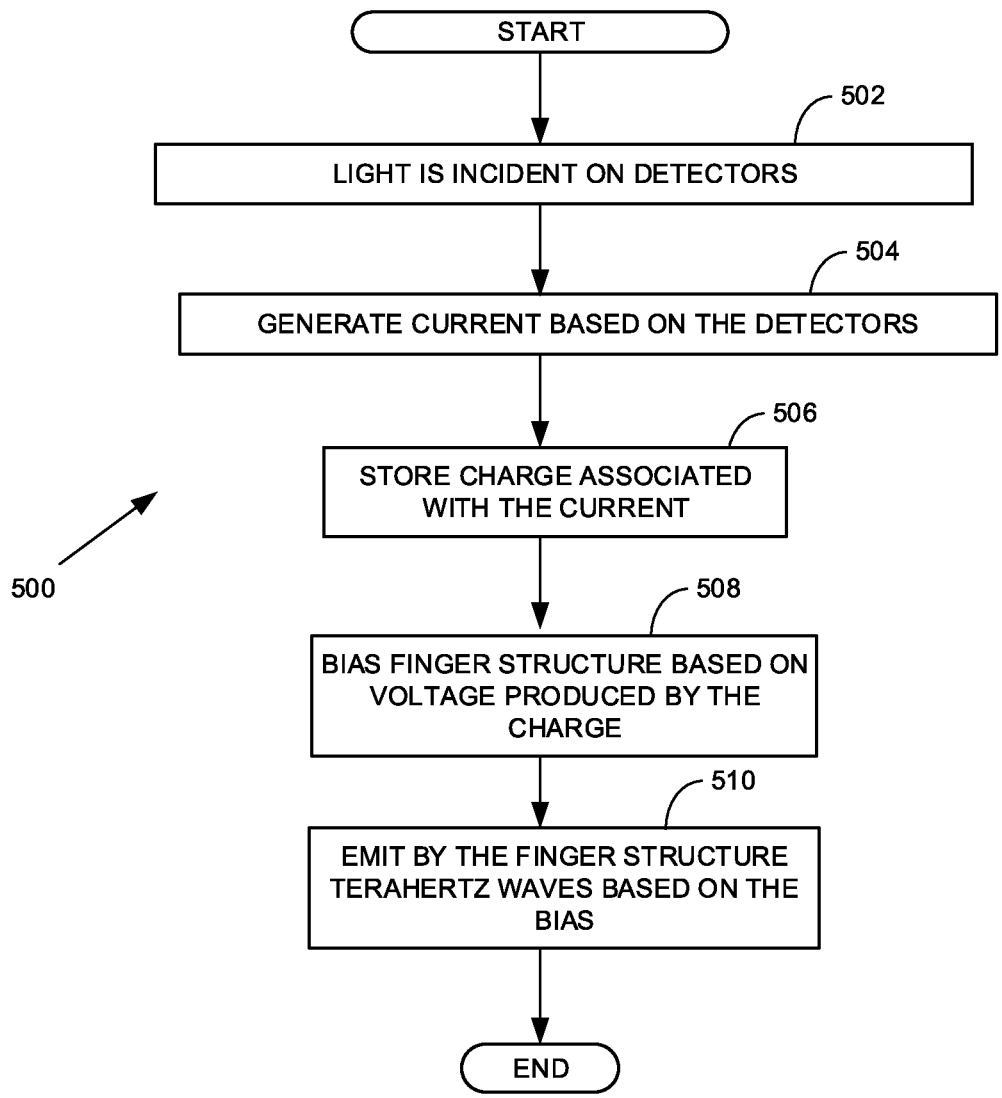
FIG. 5 is a flow diagram associated with the electromagnetic wave converter generating terahertz waves in accordance with one or more embodiments.

FIG. 5 is a flow chart 500 of functions associated with operation of the electromagnetic wave converter in generating terahertz waves. Briefly, at 502, electromagnetic waves such as light waves are incident on detectors. At 504, a current is generated based on the detectors. At 506, the capacitor stores a voltage associated with the current generated based on the detectors. At 508, the voltage biases the finger structure. At 510, electromagnetic waves such as terahertz waves may be emitted via the finger structure.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 502-510 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

Referring back, at 502, electromagnetic waves such as light waves are incident on the detectors. The light waves may be produced by a laser, and in some cases, take the form of a pulse of light from a pulsed laser. The light waves may reach the detectors via a laser on a surface of a formation and an optical waveguide whose output is directed toward the detectors. In some cases, a lens may be used to focus the light waves output from the optical waveguide onto the detectors.

At 504, a current may be generated by the detectors based on the light waves. For example, the current may be formed as a result of a photon of sufficient energy striking a photodiode of the plurality of photodiodes causing the photodiodes to output a current. The plurality of detectors may be connected in series or parallel such that a current produced by each detector may be aggregated together.

At 506, the capacitor may store a charge associated with the current generated by the detectors. When the light waves take the form of light pulses, the capacitor may have a capacitance large enough that a voltage across the capacitor produced by the charge remains relatively constant both when a pulse of light arrives at the detector and the time between pulses where the detector may not be generating any current because no light pulse is incident on the detectors.

At 508, the voltage of the capacitor may bias the finger structure. Certain conductors of the capacitor may have a positive charge and certain conductive lines of the capacitor may have a negative charge. As a result, based on the finger structure, certain of the finger lines may be at a positive potential and others may be at a negative potential due to the bias voltage.

At 510, electromagnetic waves such as terahertz waves may be emitted based on the voltage bias. The light waves, which may be the same light waves which generated the bias voltage or a different pulse, may be incident on the finger structure. Further, the light waves may be incident on the gaps which are covered and are not covered by the lightproof material. When the light waves hit the photosensitive material in a gap between the conductive lines which is not covered by the lightproof material, free charge carriers, e.g., negative and positive carriers, move into a conduction band. When the light waves hit the lightproof material in a gap between the conductive lines which is covering the photosensitive material, the light waves may not reach the semiconductor material in between the fingers and free charge carriers may not move into the conduction band since the light waves do not reach those areas.

The gaps which are covered and not covered may be arranged such that a conductive line with a negative charge is adjacent to a conductive line with a positive charge based on the voltage bias applied by the capacitor for uncovered gaps. This results in an electric field between positive and negative conductive lines in the finger structure oriented in a same direction. The electric field may cause the negative charge carriers (electrons) of the free carriers in the conduction band to be accelerated toward a positive finger line and the positive charge carriers (holes) of the free carriers in the conduction band to be accelerated toward a negative finger line. The acceleration of the charges may cause a time varying current which in turn produces electromagnetic waves in the terahertz frequency band.

The free charge carriers may be accelerated by the bias voltage to produce an electromagnetic field of a same temporal characteristics as the light pulse. Further, as the electric field between each gap which is uncovered is oriented in a same direction, the terahertz waves may positively interfere with each other. The terahertz waves may contain frequencies between 100 GHz and a few terahertz. In the case that the light waves take the form of a light pulse, each time that the light pulse hits the interdigitated finger structure, a terahertz pulse may be generated.

In some examples, a separate capacitor may not be needed in the electromagnetic wave converter. The finger structure which includes finger lines separated by the photosensitive material may act as a capacitor to store charge between light pulses so that a bias voltage is applied across the interdigitated finger structure.

In some examples, the electromagnetic wave converter may be effectively a non-linear metamaterial which converts light waves to terahertz waves. The light waves may be incident on the finger structure of the electromagnetic wave converter and the terahertz waves may leave the electromagnetic wave converter.

In some examples, the electromagnetic wave converter may not generate terahertz waves but instead generate waves at other frequencies other than terahertz frequencies. In this case, the structure shown in FIGS. 1-5 may generally be described an electromagnetic wave converter which emits electromagnetic waves of a first frequency based on electromagnetic waves of a second frequency incident on the finger structure where the first and second frequency are different.

In some examples, the electromagnetic wave converter may be constructed with discrete components rather than as an integrated structure. The components may include, for example, solar cells, a photoconductor, and a capacitor. The solar cells may convert the light pulses to a current. The capacitor may store a voltage based on the current and apply the voltage to the photoconductor. Light pulses incident on the photoconductor may result in holes and electrons being accelerated, which in turn causes terahertz pulses to be produced.

In some examples, the detectors may produce excess power beyond what is needed to generate the terahertz waves. This excess power may be used to power other devices in the wellbore such as sensors.

The electromagnetic wave converter may be used in various applications. As an example, the electromagnetic wave converter may be used to determine a molecular composition of substances. Terahertz pulses from an electromagnetic wave converter may be directed toward a sample. The sample may be a solid, liquid, or gas, for example, from an underground formation. Molecules of the sample may have unique vibrational and rotational frequencies that lie in the terahertz range, which may be excited by the terahertz pulse. As a result, certain frequency waves of the terahertz pulse that are directed toward the sample may be transmitted through the sample and others absorbed. Based on the frequency waves transmitted and/or absorbed, the molecular composition of the sample can be determined. The transmitted and/or absorbed frequency waves may uniquely identify the molecular composition, e.g., be a fingerprint. For example, the fingerprint may be an amplitude, phase and/or frequency of the transmitted and/or absorbed terahertz waves. Examples of molecular composition that may be determined via terahertz waves include a carbon and/or hydrogen composition of the sample such as $CH_2$ or $CH_3$. As another example, a ratio of water compared to the volume of total liquids in the sample may be determined, i.e., water cut.

Figure 6:
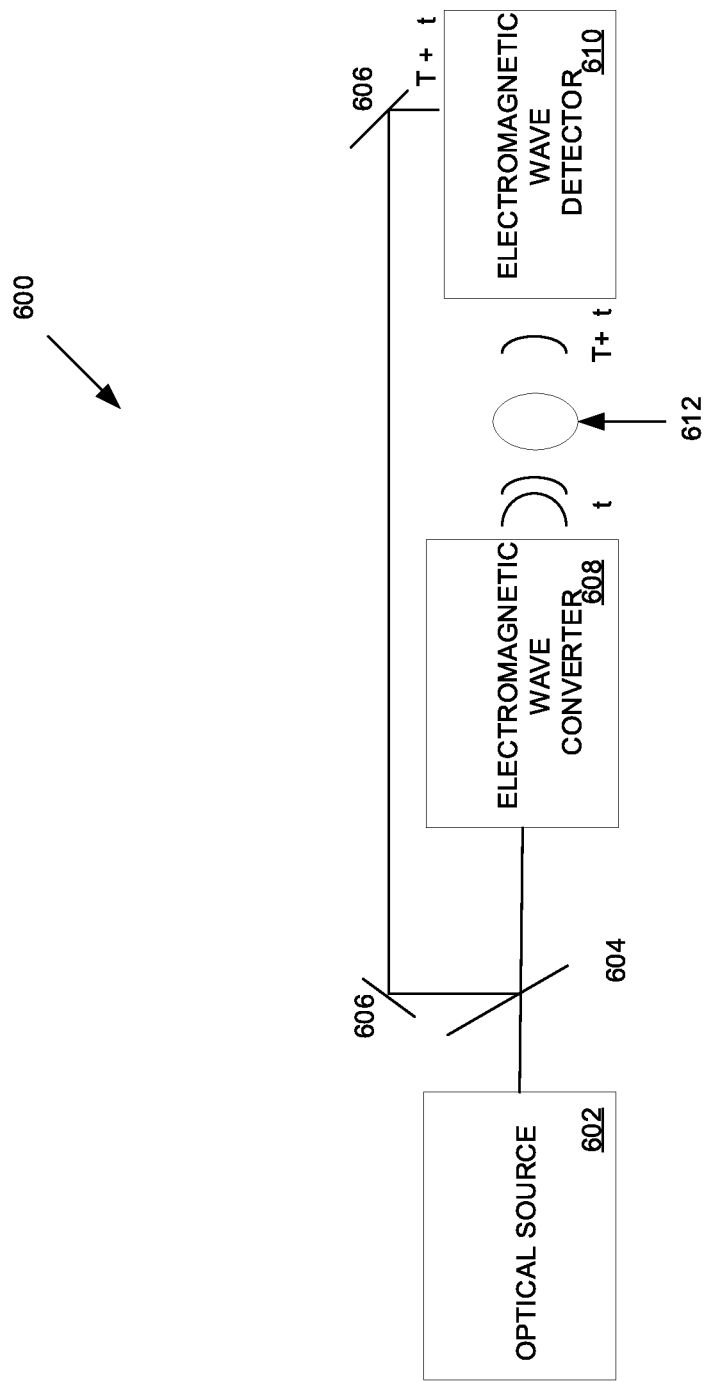
FIG. 6 is a block diagram of a terahertz analysis system in accordance with one or more embodiments.

FIG. 6 is a block diagram illustrating an example terahertz analysis system 600 for measuring properties of a sample. For example, the sample may be a solid, liquid, or gas. The example system 600 may include an optical source 602, an optical beam splitter 604, one or more mirrors 606, an electromagnetic wave converter 608, and an electromagnetic wave detector 610. The system 600 is described as a "terahertz" analysis system 600 but may not be limited to transmitting, detecting, and/or analyzing terahertz frequencies.

The optical source 602 may take the form of a laser. The laser may output a light pulse which is incident on the optical beam splitter 604. In some case, the optical source 602 may be a laser coupled to an optical waveguide. An output of the optical waveguide may be incident on the optical beam splitter. Further, in some examples, a lens may also be employed to focus light waves incident on the optical beam splitter.

The optical beam splitter 604 may be an optical device which splits the light pulse such that the light pulse, e.g., portion thereof, is directed to the electromagnetic wave converter 608 and the electromagnetic wave detector 610. The optical beam splitter 604 may take a variety of forms including glass prisms, half-silvered mirrors, mirrored prisms etc.

The electromagnetic wave converter 608 may receive the pulse of light and in response output a terahertz pulse. The terahertz pulse may be directed toward a sample 612. Certain frequencies of the terahertz pulse may be transmitted through the sample and other frequencies may be absorbed by the sample. Which frequencies are transmitted and/or absorbed may depend on molecular composition of the sample. For example, water may absorb certain frequency terahertz waves while carbon may allow certain frequency terahertz waves to pass through it. The terahertz analysis system 600 and electromagnetic wave detector 610 shown in FIG. 6 may be arranged to detect frequencies of terahertz waves which pass through the sample, but in other examples, the electromagnetic wave detector 610 may be arranged to detect frequencies which are absorbed or both frequencies which pass through and are absorbed by the sample 612.

In some examples, the electromagnetic wave detector 610 may also include an interdigitated finger structure with finger lines separated by a gap similar to that of the electromagnetic wave converter 608. A voltage bias, however, may not be applied to the finger structure. The pulse of light from the optical source 602 may be incident on the finger structure of the electromagnetic wave detector 610 via one or more mirrors 606. The mirror 606 may be silvered mirrors etc. for directing the pulse of light to the electromagnetic wave detector 610. Additionally, one or more lenses may be used to focus the light waves onto the finger structure of the electromagnetic wave detector 610.

The incident light pulse may cause free carriers in a photosensitive material of the finger structure to move into a conduction band. At a same time, the frequencies of terahertz pulse which pass through the sample may accelerate the free carriers generating a current indicative of the frequencies of the terahertz waves which are received by the electromagnetic wave detector 610. In some cases, there may be a delay T between the time the light pulse is incident on the electromagnetic wave converter 608 and the time the light pulse is incident on the electromagnetic wave detector 610 due to an additional distance of travel. For instance, the light pulse may reach the electromagnetic wave converter 608 at time t and the electromagnetic wave detector 610 at time t+T. The T may be designed so that the frequency waves of the terahertz pulse transmitted from the electromagnetic wave converter 608, through the sample 612 reaches the electromagnetic wave detector 610 at substantially a same time as the light pulse is incident on the electromagnetic wave detector 610. The current may be indicative of a spectra of terahertz waves which pass through the sample and molecular structure of the sample. In this regard, the terahertz analysis system 600 may act as a spectrograph.

In some examples, the sample 612 may be located downhole in a wellbore. In this case, the optical source 602 may be located at a surface of a formation. One or more of the optical beam splitter 604, the one or more mirrors 606, the electromagnetic wave converter 608, the electromagnetic wave detector 610 may be located downhole in a tool arranged to measure the properties of the sample.

Figure 7:
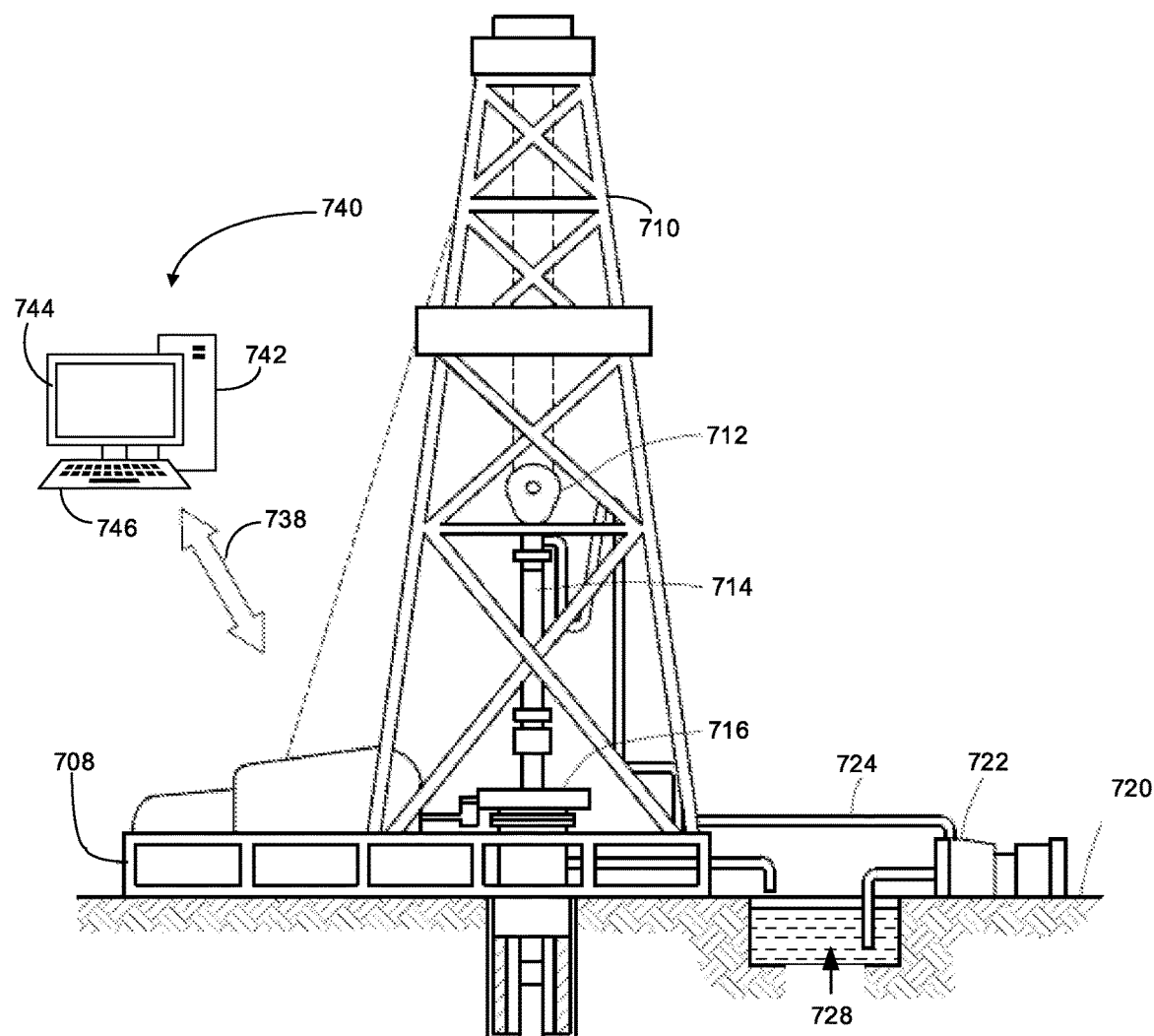
FIG. 7 is a schematic diagram of a wellbore sampling and analysis system in accordance with one or more embodiments.

FIG. 7 is a schematic diagram of an apparatus that can be used to perform some of the operations and functions described with reference to FIGS. 1-6 downhole. The apparatus includes a sampling tool 700 disposed on a drill string 702 of a depicted well apparatus. Sampling tool 700 may be used to obtain a sample such as a sample of a reservoir fluid from a subterranean formation 704. While wellbore 706 is shown extending generally vertically into the subterranean formation 704, the principles described herein are also applicable to wellbores that extend at an angle through the subterranean formation 704, such as horizontal and slanted wellbores. For example, although FIG. 7 shows a vertical or low inclination angle well, high inclination angle or horizontal placement of the well and equipment is also possible. It should further be noted that while FIG. 7 generally depicts a land-based operation, those skilled in the art will readily recognize that the principles described herein are equally applicable to subsea operations that employ floating or sea-based platforms and rigs, without departing from the scope of the disclosure.

The well apparatus further includes a drilling platform 708 that supports a derrick 710 having a traveling block 712 for raising and lowering drill string 702. Drill string 702 may include, but is not limited to, drill pipe and coiled tubing, as generally known to those skilled in the art. A kelly 714 may support drill string 702 as it may be lowered through a rotary table 716. A drill bit 718 may be attached to the distal end of drill string 702 and may be driven either by a downhole motor and/or via rotation of drill string 702 from the surface 720. Without limitation, drill bit 718 may include, roller cone bits, PDC bits, natural diamond bits, any hole openers, reamers, coring bits, and the like. As drill bit 718 rotates, it may create and extend wellbore 706 that penetrates various subterranean formations such as 704. A pump 722 may circulate drilling fluid through a feed pipe 724 to kelly 714, downhole through interior of drill string 702, through orifices in drill bit 718, back to surface 720 via annulus 726 surrounding drill string 702, and into a retention pit 728.

Drill bit 718 may be just one piece of a downhole assembly that may include one or more drill collars 730 and sampling tool 700. One or more of drill collars 730 may form a tool body 732, which may be elongated as shown on FIG. 7. Tool body 732 may be any suitable material, including without limitation titanium, stainless steel, alloys, plastic, combinations thereof, and the like. Sampling tool 700 may further include one or more sensors 734 for measuring properties of the fluid sample, reservoir fluid, wellbore 706, subterranean formation 704, or the like. As previously described, fluid samples collected by sampling tool 700 may comprise a reservoir fluid.

The sensors 734 may include a terahertz analysis system configured and operable to derive properties and characterize the fluid samples. The electromagnetic wave converter and/or electromagnetic wave detector may measure frequencies of terahertz waves transmitted through and/or absorbed by the fluid sample and facilitate translating such measurements into a chemical composition of the fluid sample. In example, the electromagnetic wave converter may be coupled to a laser on the surface 720 via a waveguide such as a fiber optic cable. This way light from the laser may be directed downhole to the electromagnetic wave converter so that it may emit terahertz waves. Fluid analysis module 736 may further include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, fluid analysis module 736 may include random access memory (RAM), one or more processing units, such as a central processing unit (CPU), or hardware or software control logic, ROM, and/or other types of nonvolatile memory.

Any suitable technique may be used for transmitting signals, e.g., an indication of current output by the electromagnetic wave detector, from sampling tool 700 to a computing system residing on the surface 720. As illustrated, a communication link 738 (which may be wired or wireless, for example) may be provided that may transmit data from sampling tool 700 to an information handling system 740 at the surface 720. Communication link 738 may implement one or more of various known drilling telemetry techniques such as mud-pulse, acoustic, electromagnetic, etc. Information handling system 740 may include a processing unit 742, a monitor 744, an input device 746 (e.g., keyboard, mouse, etc.), and/or computer media 748 (e.g., optical disks, magnetic disks) that can store code representative of the methods described herein. Information handling system 740 may act as a data acquisition system and possibly a data processing system that analyzes information from sampling tool 700. For example, information handling system 740 may process the information from sampling tool 700 for determination of a chemical composition. Information handling system 740 may also determine additional properties of the fluid sample (or reservoir fluid), such as component concentrations, pressure-volume-temperature properties (e.g., bubble point, phase envelop prediction, etc.) based on the chemical composition. This processing may occur at surface 720 in real-time. Alternatively, the processing may occur at surface 720 or another location after withdrawal of sampling tool 700 from wellbore 706. Alternatively, the processing may be performed by an information handling system in wellbore 706, such as fluid analysis module 736. The resultant chemical composition of the sample may then be transmitted to surface 720, for example, in real-time to a fluid analytics client running on information handling system 740.

In some examples, the sampling may occur while drilling. In this case, the fluid analysis module 736 may be isolated from any vibrations produced during the drilling. For example, shock absorbers may be used. In other examples, the drilling may stop and then the sampling may occur so that impact of vibrations is minimized.

Figure 8:
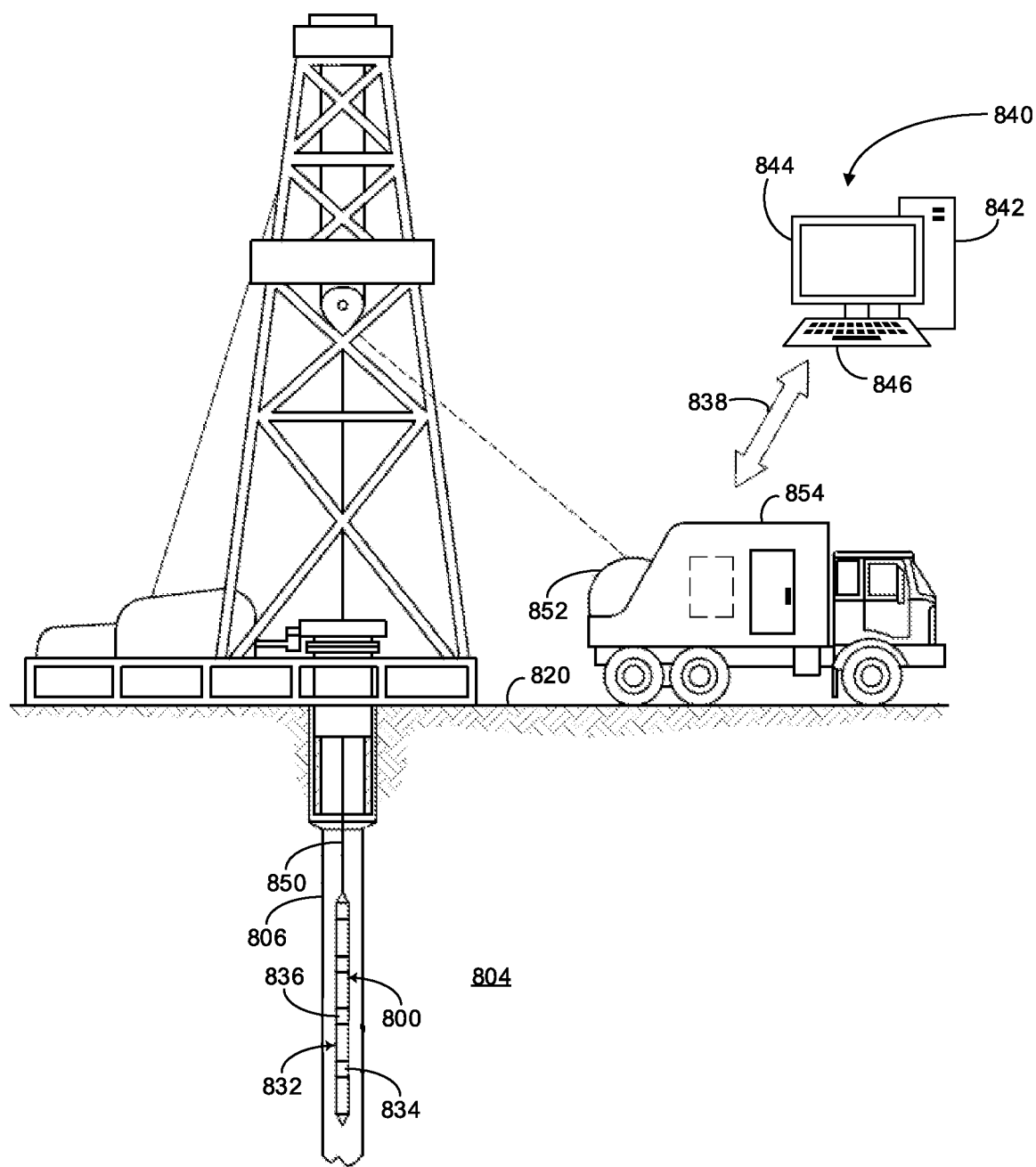
FIG. 8 is a schematic diagram of an example downhole fluid sampling and analysis tool on a wireline in accordance with one or more embodiments.

Referring now to FIG. 8, a schematic diagram is shown of downhole sampling tool 800 on a wireline 850. As illustrated, a wellbore 806 may extend through subterranean formation 804. Downhole sampling tool 800 may be similar in configuration and operation to downhole sampling tool 700 shown on FIG. 7 except that FIG. 8 shows downhole fluid sampling tool 800 disposed on wireline 850. It should be noted that while FIG. 8 generally depicts a land-based drilling system, those skilled in the art will readily recognize that the principles described herein are equally applicable to subsea drilling operations that employ floating or sea-based platforms and rigs, without departing from the scope of the disclosure.

As illustrated, a hoist 852 may be used to run sampling tool 800 into wellbore 806. Hoist 852 may be disposed on a recovery vehicle 854. Hoist 852 may be used, for example, to raise and lower wireline 850 in wellbore 806. While hoist 852 is shown on recovery vehicle 854, it should be understood that wireline 850 may alternatively be disposed from a hoist 852 that is installed at surface 820 instead of being located on recovery vehicle 854. Downhole sampling tool 800 may be suspended in wellbore 806 on wireline 850. Other conveyance types may be used for conveying downhole sampling tool 800 into wellbore 806, including coiled tubing, wired drill pipe, slickline, and downhole tractor, for example. Downhole sampling tool 800 may comprise a tool body 832, which may be elongated as shown on FIG. 8. Tool body 832 may be any suitable material, including without limitation titanium, stainless steel, alloys, plastic, combinations thereof, and the like. Downhole sampling tool 800 may further include a fluid analysis module 836 with a terahertz analysis system for measuring a chemical composition of the fluid sample. The electromagnetic wave converter and/or electromagnetic wave detector may measure frequencies of terahertz waves transmitted through and/or absorbed by the fluid sample and translate such measurements into a chemical composition of the fluid sample. The electromagnetic wave converter may be coupled to a laser on the surface 720 via a waveguide such as a fiber optic cable. The electromagnetic wave converter may be coupled to a laser on the surface 820 via a waveguide such as a fiber optic cable. The downhole fluid sampling tool 800 may be used to collect fluid samples from subterranean formation 804. The downhole fluid sampling tool 800 may obtain and separately store different fluid samples from subterranean formation 804.

As previously described, information from sampling tool 800 may be transmitted to an information handling system 840, which may be located at surface 820. As illustrated, communication link 838 (which may be wired or wireless, for example) may be provided that may transmit data, e.g., an indication of the current output by the electromagnetic wave detector, from downhole sampling tool 800 to an information handling system 840 at surface 820. Information handling system 840 may include a processing unit 842, a monitor 844, an input device 846 (e.g., keyboard, mouse, etc.), and/or computer media 848 (e.g., optical disks, magnetic disks) that can store code representative of the methods described herein. In addition to, or in place of processing at surface 820, processing may occur downhole (e.g., fluid analysis module 836).

Figure 9:
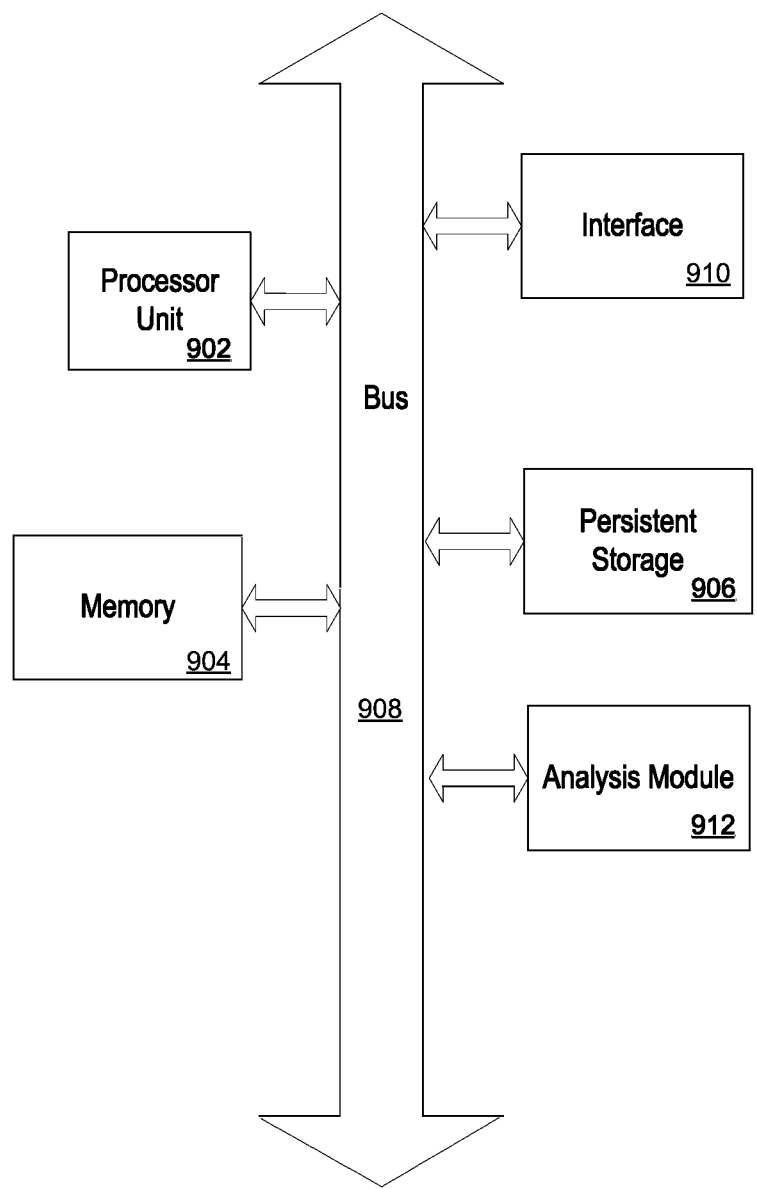
FIG. 9 is a block diagram of a computer system of the terahertz analysis system in accordance with one or more embodiments.

FIG. 9 is a block diagram of a system for performing the disclosed functions. The system may take the form of a computer system 900. The computer system 900 may be located at a surface of a formation or downhole and in communication with the electromagnetic wave converter and/or detector. In the case that the computer system 900 is downhole, the computer system 900 may be rugged, unobtrusive, can withstand the temperatures and pressures in situ at the wellbore.

The computer system 900 includes a processor 902 (possibly including multiple processors, multiple cores, multiple nodes, and/or implementing multi-threading, etc.). The computer device includes memory 904. The memory 904 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computer system also includes a persistent data storage 906. The persistent data storage 906 can be a hard disk drive, such as magnetic storage device. The computer device also includes a bus 908 (e.g., PCI, ISA, PCI-Express, HyperTransport® bus, InfiniBand® bus, NuBus, etc.) and an interface 910 in communication with the terahertz analysis system. For example, the network interface 910 may be coupled to the electromagnetic detector so as to receive an indication of the current which is to be analyzed. The terahertz detector may have a transmitter which transmits the indication of the current via a wire or fiber optic cable to the computer system 900. The indication of current may be conveyed in other ways as well.

The analysis module 912 may analyze an indication of transmission and/or absorption spectra by the sample (e.g., based on current output by an electromagnetic wave detector) to identify a molecular composition of the sample. For example, the analysis module 912 may perform a frequency analysis of the current, e.g., a Fourier transformation, output by the electromagnetic wave detector, received at the interface 910, and stored in persistent storage 906. Terahertz waves incident on certain types of molecules may result in a unique current with a unique frequency spectrum. The analysis module 912 may compare the frequency analysis to a frequency spectrum stored in the persistent storage 906. The frequency spectrum may be a frequency analysis of current for a known sample with a known molecular composition. If the frequency spectrum of the current for the known samples with the known molecular composition matches the frequency analysis, then the molecular composition of the sample may be the known sample. For example, the frequency analysis may allow for determining at least the presence and quantity of specific inorganic gases such as $CO_2$ and $H_2S$, organic gases such as C1, C2, C3, etc., organic liquids, water phases and saturation, troublesome solids such as waxes and asphaltenes, etc. Other properties, of course, may also be sensed and detected. Further, relationships, ratios and other data is determined by the computer system 900 including water cut.

Any one of the previously described functionalities may be partially (or entirely) implemented in hardware and/or on the processor 902. For example, the functionality may be implemented with an application specific integrated circuit, in logic implemented in the processor 902, in a co-processor on a peripheral device or card, etc. Further, realizations may include fewer or additional components not illustrated in FIG. 9 (e.g., video cards, audio cards, additional network interfaces, peripheral devices, etc.). The processor 902 and the network interface 910 are coupled to the bus 908. Although illustrated as being coupled to the bus 908, the memory 904 may be coupled to the processor 902.

As will be appreciated, aspects of the disclosure may be embodied as a system, method, or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized herein. The machine-readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any non-transitory tangible medium that can contain, or store a program for use by or in connection with an instruction execution system, apparatus, or device. A machine readable storage medium is not a machine readable signal medium.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Additional embodiments can include varying combinations of features or elements from the example embodiments described above. For example, one embodiment may include elements from three of the example embodiments while another embodiment includes elements from five of the example embodiments described above.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1: Apparatus comprising: a finger structure having a plurality of conductive lines, wherein at least two of the plurality of conductive lines are separated by an electromagnetically sensitive material; a plurality of detectors which surround at least a portion of the finger structure; and a capacitor having a plurality of conductive lines separated by a dielectric material, wherein the capacitor is connected to the detectors and the finger structure.

Embodiment 2: The apparatus of Embodiment 1, wherein the plurality of detectors converts light waves into a current which the capacitor stores as a charge Embodiment 3: The apparatus of Embodiment 1 or 2, wherein a voltage is applied by the capacitor across the plurality of conductive lines of the finger structure based on the charge Embodiment 4: The apparatus of any of Embodiments 1-3, wherein an electric field produced across any two conductive lines of the plurality of lines of the finger structure based on the voltage is oriented in a same direction Embodiment 5: The apparatus of any of Embodiments 1-4, wherein the electromagnetically sensitive material is a photosensitive material; and wherein light from a laser incident on the photosensitive material causes free carriers in the photosensitive material to move to a conduction band and be accelerated by the voltage across the conductive lines of the finger structure to generate terahertz waves Embodiment 6: The apparatus of any of Embodiments 1-5, wherein the laser is a pulsed laser which is to be positioned at a surface of a formation and the apparatus is to be positioned downhole in a wellbore and the laser is coupled to the apparatus via a waveguide.

Embodiment 7: The apparatus of any of Embodiments 1-6, wherein certain of the photosensitive material is covered by a lightproof material which causes the generated terahertz waves to constructively interfere.

Embodiment 8: The apparatus of any of Embodiments 1-7, wherein the detectors are photodiodes.

Embodiment 9: The apparatus of any of Embodiments 1-8, wherein the capacitor surrounds a portion of the finger structure and the plurality of detectors.

Embodiment 10: A method comprising: receiving, at a plurality of detectors and a finger structure, first electromagnetic waves; generating, by the plurality of detectors, a current based on the first electromagnetic waves; storing, by a capacitor, charge based on the current; applying, by the capacitor, a voltage across the finger structure having a plurality of conductive lines, wherein at least two of the plurality of conductive lines are separated by an electromagnetically sensitive material, and wherein the voltage produces an electric field across the finger structure; and emitting, by the finger structure, second electromagnetic waves based on the first electromagnetic waves and the electric field, wherein free carriers in the electromagnetic sensitive material of the finger structure are accelerated based on the electric field to produce the second electromagnetic waves.

Embodiment 11: The method of Embodiment 10 wherein applying the voltage causes the electric field produced across any two conductive lines of the plurality of conductive lines of the finger structure based on the voltage to be oriented in a same direction.

Embodiment 12: The method of Embodiment 10 or 11, wherein emitting the second electromagnetic waves comprises emitting terahertz waves based on the free carriers in the electromagnetically sensitive material moving to a conduction band and being accelerated by the electric field across the conductive lines of the finger structure to produce the terahertz waves Embodiment 13: The method of any of Embodiments 10-12, wherein the first electromagnetic waves are light waves received via an optical waveguide coupled to a laser.

Embodiment 14: The method of any of Embodiments 10-13, wherein receiving the first electromagnetic waves comprises receiving a plurality of light pulses, and wherein the capacitor maintains the voltage substantially constant across the finger structure between the light pulses Embodiment 15: A system comprising: an electromagnetic wave source which is to be positioned at a surface of a formation; a downhole tool which is to be positioned in a wellbore of the formation; and a waveguide which couples first electromagnetic waves from the electromagnetic wave source on the surface of the formation to the downhole tool; wherein downhole tool comprises an electromagnetic wave converter having: a finger structure having a plurality of conductive lines, wherein at least two of the plurality of conductive lines are separated by an electromagnetically sensitive material; a plurality of detectors which surround at least a portion of the finger structure; and a capacitor having a plurality of conductive lines separated by a dielectric material wherein the capacitor is connected to the detectors and the finger structure; and wherein the electromagnetic wave converter is to emit, as part of formation evaluation, second electromagnetic waves into the formation based on the first electromagnetic waves from the electromagnetic wave source.

Embodiment 16: The system of Embodiment 15, wherein the first electromagnetic waves are light waves; and wherein the plurality of detectors converts the light waves into a current which the capacitor stores as a charge.

Embodiment 17: The system of Embodiment 15 or 16, wherein a voltage is applied by the capacitor across the plurality of conductive lines of the finger structure based on the charge.

Embodiment 18: The system of any of Embodiments 15-17, wherein an electric field produced across any two conductive lines of the plurality of conductive lines of the finger structure based on the voltage is oriented in a same direction.

Embodiment 19: The system of any of Embodiments 15-18, wherein the electromagnetic wave source is a pulsed laser and the waveguide is a fiber optic cable.

Embodiment 20: The system of any of Embodiments 15-19, wherein the first electromagnetic waves is light; wherein the electromagnetically sensitive material is a photosensitive material; and wherein the light from the electromagnetic source incident on the photosensitive material causes free carriers in the photosensitive material to move to a conduction band and be accelerated across the conductive lines of the finger structure to generate the second electromagnetic waves; where the second electromagnetic waves are terahertz waves.

What is claimed is:

1. Apparatus comprising:
a finger structure having a plurality of conductive lines, wherein at least two of the plurality of conductive lines are separated by an electromagnetically sensitive material;
a plurality of detectors which surround at least a portion of the finger structure; and
a capacitor having a plurality of conductive lines separated by a dielectric material, wherein the capacitor is connected to the detectors and the finger structure.

2. The apparatus of claim 1, wherein the plurality of detectors converts light waves into a current which the capacitor stores as a charge.

3. The apparatus of claim 2, wherein a voltage is applied by the capacitor across the plurality of conductive lines of the finger structure based on the charge.

4. The apparatus of claim 3, wherein an electric field produced across any two conductive lines of the plurality of lines of the finger structure based on the voltage is oriented in a same direction.

5. The apparatus of claim 3, wherein the electromagnetically sensitive material is a photosensitive material; and wherein light from a laser incident on the photosensitive material causes free carriers in the photosensitive material to move to a conduction band and be accelerated by the voltage across the conductive lines of the finger structure to generate terahertz waves.

6. The apparatus of claim 5, wherein the laser is a pulsed laser which is to be positioned at a surface of a formation and the apparatus is to be positioned downhole in a wellbore and the laser is coupled to the apparatus via a waveguide.

7. The apparatus of claim 5, wherein certain of the photosensitive material is covered by a lightproof material which causes the generated terahertz waves to constructively interfere.

8. The apparatus of claim 1, wherein the detectors are photodiodes.

9. The apparatus of claim 1, wherein the capacitor surrounds a portion of the finger structure and the plurality of detectors.

10. A method comprising:
receiving, at a plurality of detectors and a finger structure, first electromagnetic waves;
generating, by the plurality of detectors, a current based on the first electromagnetic waves;
storing, by a capacitor, charge based on the current;
applying, by the capacitor, a voltage across the finger structure having a plurality of conductive lines, wherein at least two of the plurality of conductive lines are separated by an electromagnetically sensitive material, and wherein the voltage produces an electric field across the finger structure; and
emitting, by the finger structure, second electromagnetic waves based on the first electromagnetic waves and the electric field, wherein free carriers in the electromagnetic sensitive material of the finger structure are accelerated based on the electric field to produce the second electromagnetic waves.

11. The method of claim 10 wherein applying the voltage causes each component of the electric field produced across any two conductive lines of the plurality of conductive lines of the finger structure based on the voltage to be oriented in a same direction.

12. The method of claim 10, wherein emitting the second electromagnetic waves comprises emitting terahertz waves based on the free carriers in the electromagnetically sensitive material moving to a conduction band and being accelerated by the electric field across the finger structure to produce the terahertz waves.

13. The method of claim 10, wherein the first electromagnetic waves are light waves received via an optical waveguide coupled to a laser.

14. The method of claim 10, wherein receiving the first electromagnetic waves comprises receiving a plurality of light pulses, and wherein the capacitor maintains the voltage substantially constant across the finger structure between the plurality of light pulses.

15. A system comprising:
an electromagnetic wave source which is to be positioned at a surface of a formation;
a downhole tool which is to be positioned in a wellbore of the formation; and
a waveguide which couples first electromagnetic waves from the electromagnetic wave source on the surface of the formation to the downhole tool;
wherein downhole tool comprises an electromagnetic wave converter having:
a finger structure having a plurality of conductive lines, wherein at least two of the plurality of conductive lines are separated by an electromagnetically sensitive material;
a plurality of detectors which surround at least a portion of the finger structure; and
a capacitor having a plurality of conductive lines separated by a dielectric material, wherein the capacitor is connected to the detectors and the finger structure; and
wherein the electromagnetic wave converter is to emit, as part of formation evaluation, second electromagnetic waves into the formation based on the first electromagnetic waves from the electromagnetic wave source.

16. The system of claim 15, wherein the first electromagnetic waves are light waves; and
wherein the plurality of detectors converts the light waves into a current which the capacitor stores as a charge.

17. The system of claim 16, wherein a voltage is applied by the capacitor across the plurality of conductive lines of the finger structure based on the charge.

18. The system of claim 17, wherein an electric field produced across any two conductive lines of the plurality of conductive lines of the finger structure based on the voltage is oriented in a same direction.

19. The system of claim 15, wherein the electromagnetic wave source is a pulsed laser and the waveguide is a fiber optic cable.

20. The system of claim 15, wherein the first electromagnetic waves are light; wherein the electromagnetically sensitive material is a photosensitive material; wherein the light from the electromagnetic source incident on the photosensitive material causes free carriers in the photosensitive material to move to a conduction band and be accelerated across the conductive lines of the finger structure to generate the second electromagnetic waves; and wherein the second electromagnetic waves are terahertz waves.

* * * * *